United States Patent [19]

Gueguin

[11] 4,187,117

[45] Feb. 5, 1980

[54] TITANIUM SLAG-COKE GRANULES SUITABLE FOR FLUID BED CHLORINATION

[75] Inventor: Michel Gueguin, Tracy, Canada

[73] Assignee: Quebec Iron and Titanium Corporation - fer et Titane du Quebec, Inc., Sorel, Canada

[21] Appl. No.: 899,166

[22] Filed: Apr. 24, 1978

Related U.S. Application Data

[60] Division of Ser. No. 811,761, Jun. 30, 1977, Pat. No. 4,117,076, which is a continuation of Ser. No. 675,954, Apr. 12, 1976, abandoned.

[51] Int. Cl.$^2$ .................... C04B 35/52; C01G 23/02
[52] U.S. Cl. ........................................ 106/56; 106/30; 423/78; 423/79
[58] Field of Search .................. 106/56, 300; 423/78, 423/79

[56] References Cited

U.S. PATENT DOCUMENTS

| | | | |
|---|---|---|---|
| 2,253,471 | 8/1941 | Muskat et al. | 423/78 |
| 2,479,904 | 8/1949 | Cole | 423/78 |
| 2,723,903 | 11/1955 | Cyr et al. | 423/78 |
| 2,753,243 | 7/1956 | Lyons | 423/78 |
| 2,761,760 | 9/1956 | Kamlet | 423/78 |
| 2,805,120 | 9/1957 | Plant | 423/78 |

*Primary Examiner*—James Poer

[57] ABSTRACT

A process for the production of titanium tetrachloride from titanium oxide bearing material in a fluid bed chlorinator at low temperatures and articles of manufacture suitable for use in fluid bed chlorinators for obtaining titanium tetrachloride.

3 Claims, 3 Drawing Figures

TITANIUM SLAG-COKE GRANULES SUITABLE FOR FLUID BED CHLORINATION

This is a divisional of application Ser. No. 811,761, filed June 30, 1977, now U.S. Pat. No. 4,117,076, dated Sept. 26, 1978, which in turn is a continuation of Ser. No. 675,954, filed Apr. 12, 1976, and now abandoned.

This invention relates to a process for producing a material suitable for manufacturing titanium pigment via chloride process. More particularly, this invention relates to a process whereby starting from relatively low $TiO_2$ bearing materials, more specifically from slags containing relatively high amounts of undesirable alkali-earth elements, and which are rich in silica and alumina as well, a material is produced which is suitable for obtaining titanium pigment, by further processing.

Still further, this invention relates to a process for producing a material containing both $TiO_2$ and carbon in unique granules suitable for fluid bed chlorination of these granules.

BACKGROUND OF THE INVENTION AND GENERAL DESCRIPTION OF PRIOR ART

In the well known electro-smelting process of ilmenite, metallic iron and a slag enriched in $TiO_2$ is produced. Such slags are especially appreciated by the $TiO_2$ pigment producers using the sulfate process route. A typical analysis of these slags is:

| | |
|---|---|
| $TiO_2$ | 71.0% |
| FeO | 11.8% |
| $SiO_2$ | 5.2% |
| $Al_2O_3$ | 5.5% |
| CaO | 0.8% |
| MgO | 5.1% |
| $V_2O_5$ | 0.58% |
| $Cr_2O_3$ | 0.18% |
| MnO | 0.24% |

However, because of the impurities contained in these slags, these slags are not generally accepted by the chloride process $TiO_2$ pigment producers. To be suitable for the latter process, a slag must have essentially a low CaO and a low MgO content and secondarily a low $Al_2O_3$ and $SiO_2$ content. Typically, these constituents are found in the following ranges when suitable as a starting material in the chloride process:

| | | |
|---|---|---|
| CaO from | 0.0 to 0.2 | in weight percent |
| MgO from | 0.0 to 1.0 | in weight percent |
| $Al_2O_3$ from | 0.0 to 1.0 | in weight percent |
| $SiO_2$ from | 0.0 to 1.5 | in weight percent |

The undesirable impurities CaO and MgO are unwanted because these generate high boiling point chlorides in the process. These chlorides tend to accumulate in the fluidized bed used in the chloride process and, under operating conditions, remain in a molten form causing lower chlorination rate, bed sticking and defluidization.

The two other impurities mentioned above, namely $Al_2O_3$ and $SiO_2$, are essentially high chlorine gas consumers which increase the cost for producing $TiO_2$ pigment and complicate the purification of $TiCl_4$ as well as aggravate scrubbing problems of the $TiCl_4$ distillation residues.

In other $TiO_2$ source materials, including slags, depending on the origin of the ore, MnO could also be present. Manganese oxide is easier to distill from the reaction mixture than $MgCl_2$ and $CaCl_2$, however, it is also undesirable in large amounts.

The chloride process to produce titanium is based on the intermediate formation of titanium tetrachloride according to the following equation:

$$TiO_2 + 2C + 2Cl_2 \rightarrow TiCl_4 + 2CO \text{ (or } CO_2)$$

The preferred raw material is natural or artificial rutile, the latter being manufactured from ilmenite by various processes.

Ilmenite is also widely used as a raw material for $TiO_2$ pigment production. In the chlorination process, impurities associated with ilmenite, principally iron, cause the formation of large amounts of iron chlorides as either ferrous or ferric chlorides. The chlorides must be disposed of or processed for chlorine recycling.

Several processes for chlorination of high alkali-earth slags have been tried or proposed. The only one which heretofore has been effectively used involved the blending of a slag, such as Sorelslag, either with rutile or ilmenite with low CaO and MgO content. Such practice implies a source of these feeds and does not solve the problems mentioned above.

Another approach for avoiding the problem plagued use of slag consists of making briquets of slag and carbonaceous material. This is an impractical process because it necessitates batch operation. Still other processes have been operated at higher temperature in a fluid bed eventually with an excess of chlorine, such as disclosed in U.S. Pat. No. 2,974,009, and in presence of excess of carbon which must be continuously discharged, such as disclosed in U.S. Pat. No. 3,074,777, as well as where the starting material is washed before recycling including any unreacted material associated therewith (described in U.S. Pat. No. 2,701,180). Still another proposal has been to use a new reactor to produce flash chlorination of these slags such as disclosed in U.S. Pat. No. 3,787,556.

In absence of an oxygen acceptor, the chlorination rate of titanium dioxide is very low even at temperatures as high as 1000° C. In presence of an oxygen acceptor, e.g., carbon, the reaction proceeds already at temperatures as low as 500° C. Two different mechanisms are involved in the temperature ranges of 500°–800° C. and above 900° C. as further amplified. At low temperatures, good contact between $TiO_2$ and carbon is necessary to get the reaction started while at high temperature a close contact is not imperative. Based on these facts, the briquetting process and also pelletizing and shaft furnace chlorination with continuous discharge of the unreacted material, such as disclosed in U.S. Pat. No. 3,359,065, does permit a low temperature reaction.

The reducing agent, so-called oxygen acceptor, generally employed in actual chlorinators is petroleum coke which is also a high cost material. In the present invention the carbon source is pyrolyzed bituminous coal which is less expensive than petroleum coke.

DESCRIPTION OF THE INVENTION AND DISCLOSURE OF EMBODIMENTS THEREOF

Figure 1:
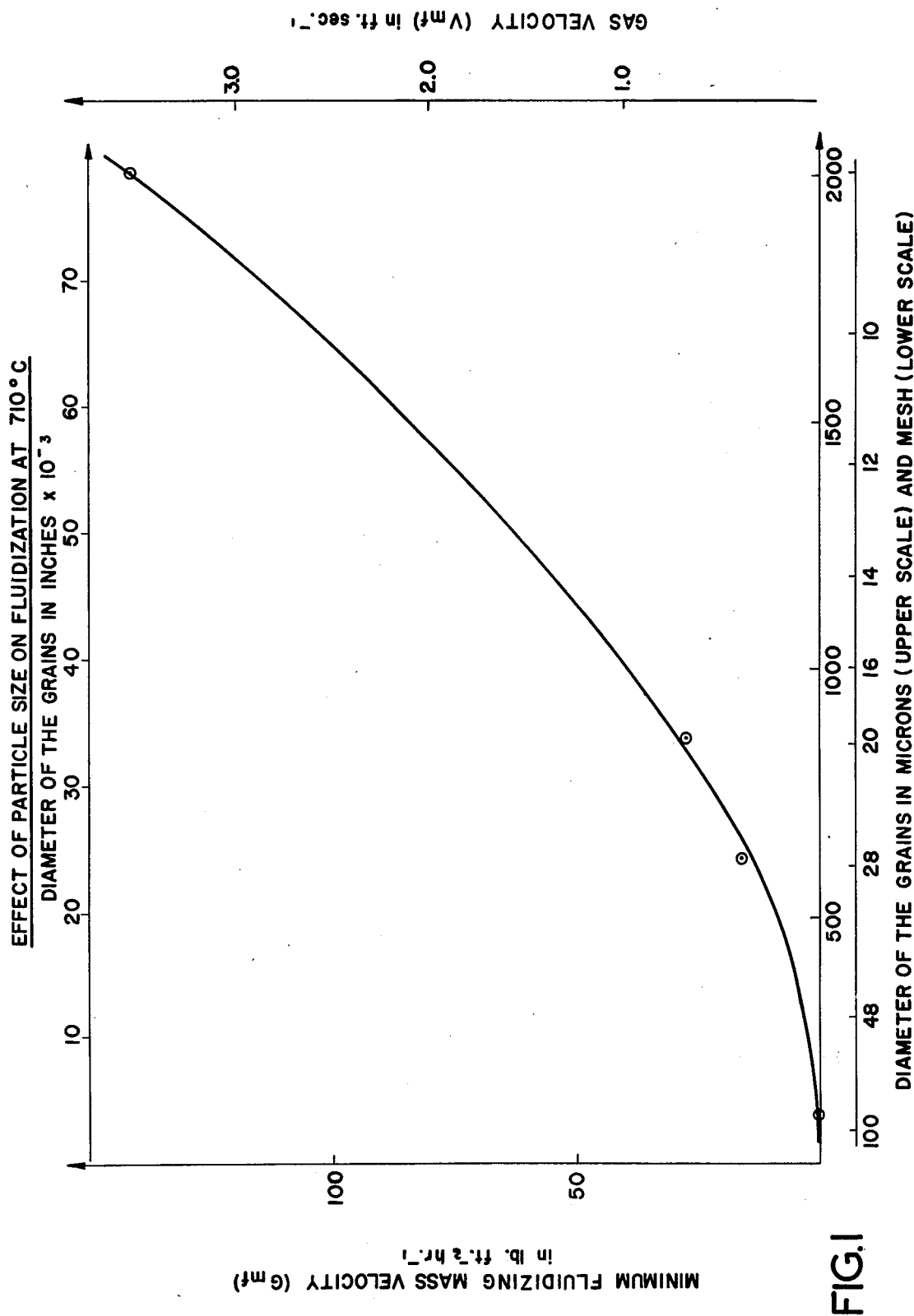
FIG. 1 is a graph showing the effect of particle size of fluidization.

In accordance with this invention, the use of a slag for a starting material suitable for use in a chloride process and derived from a source such as ilmenite is an embodiment of this invention when these slags are processed to be suitable as intermediates. As there are upgraded ilmenites, but not as rich in titanium value as rutile, various degrees of upgrading are within the scope of the invention. However, the ilmenite feed to a smelter in which iron is extracted and a $TiO_2$ slag is obtained should be at least low in CaO, MgO and MnO for the above mentioned reasons to be suitable for chlorination purposes.

A titanium slag commercially produced is known as "Sorelslag" and this slag contains high amounts of CaO, MgO, $SiO_2$, and $Al_2O_3$. Typically, these are 0.8; 5.1; 5.2 and 5.5 percent by weight, respectively. The purpose of this invention is to utilize this slag and to provide a process to use Sorelslag and similar titanium bearing materials as starting material for the chloride process route for making $TiO_2$ pigment.

According to the present invention, however, it is possible to use the above described difference in the chlorination mechanisms to chlorinate titanium slags which are high in CaO and MgO contents in a fluid bed, and moreover, without a need for a continuous discharge at the bottom or on the side of the reactor while the reactor is operated under mild and not severe conditions for the reactor. By mild reactor conditions, it is meant temperature in the 600°–800° C. range compare to 950°–1100° C. in other reactors. No bed sticking occurs and the high chlorine consumers, i.e., $Al_2O_3$ and $SiO_2$, are only very slightly or not at all attacked. This results in significant chlorine savings.

According to the present invention, a titanium bearing compound and especially titania slag is to be ground to a very fine powder, then mixed in a proper ratio with a bituminous coking coal also in powdery form. A suitable binder can be added during the mixing. The slag-coal mixture is then pelletized into small grains, e.g., of a size from −28 to +100 mesh, the "green" grains are later heated up to 500° C. at least for a few seconds in order to form a coke structure and these grains are further baked at 900°–1000° C. for 10 to 20 minutes to lower the hydrogen content as far as possible (initially at about 2.0% of the initial dry weight to 0.2% of the weight of the coked grain). The grains are cooled down in inert atmosphere or discharged in water. The removal of hydrogen is for the purpose of decreasing the chlorine consumption due to possible HCl formation.

The resulting grains having a suitable size (e.g., from −28 to +100 mesh) for fluidization are then chlorinated in a conventional fluid bed at about 700° C. in a continuous system. A conventional fluid bed is disclosed in U.S. Pat. No. 3,957,757. The porous coke structure with high surface area retains the low volatility chlorides, i.e., $CaCl_2$ and $MgCl_2$, present in a molten state.

As the reaction proceeds, the grains become lighter and their fluidization property changes. At the same time, the surface of the grains abrades forming a $TiO_2$-free dry dust which is evacuated in the gas stream. As the pores are quite large, (of the order of 1 to 50 microns) the chlorine has no difficulty in diffusing into the core of the grains generating $TcCl_4$ with the carbon evenly distributed within a grain. Finally, the carbon skeleton, reinforced by the unreacted silica and alumina, impregnated by $CaCl_2$ and $MgCl_2$ and almost free of titanium oxide is evacuated with the chloride vapors and $CO_2$ generated in the process and is easily collected and separated. The excess carbon may be recovered after washing with water, the carbon skeleton including the trapped chlorides. The $TiCl_4$ is later treated as usual.

A source material of titanium oxide having the above described high alkali-earth, alkali, silica, alumina or manganese content are such as: Sorelslag, brazilian anatase, rock ilmenites, perovskite, etc. A high content of alkali-earth, alkali, silica, alumina, or manganese in said source material is meant wherein individually these components are present in percent by weight of at least 1% alkali earth, 1% alkali, 3% silica, 3% alumina, 1% manganese, respectively.

The following example illustrates the practice of the invention; it is not intended to limit the invention, but merely illustrate the invention.

EXAMPLE

A titanium slag of the following composition (in percent by weight):

| $TiO_2$ | FeO | $SiO_2$ | $Al_2O_3$ | $Cr_2O_3$ | $V_2O_5$ | CaO | MgO |
|---|---|---|---|---|---|---|---|
| 71.0 | 11.8 | 5.2 | 5.5 | 0.18 | 0.58 | 0.8 | 5.1 | was ground to 99 percent, −325 mesh.

A bituminous coal of the following analysis (in percent by weight).

| Moisture | Ash | Fixed Carbon | Volatiles |
|---|---|---|---|
| 0.24 | 5.70 | 62.00 | 32.30 | was 100 percent ball milled to −325 mesh.

A 2:1 ratio of slag:coal was mixed for 1 hour after mixing with a percent by weight of the dry solid of a solution of a binder chosen from the following compounds used as binders: ferrous chloride, sodium sulfite, starch, glue, molasses, sugar, bentonite, sulfuric acid, spent liquor from $TiO_2$ pigment plant, or Lignosol (Lignosol is cellulose sulfonate). The amount of binder may vary from 0.25 to 1.00% by the dry weight of coal+-slag.

The so obtained homogeneous mixture was pelletized in a 14" pelletizing disk running at 45 r.p.m. at a 42° angle using a batch operation and a water spray. The disk was stopped when most of the granules or pellets seemed to have grown to the desired particle size. A desirable particle size is from 8 to 150 mesh, preferably from 28 to 100 mesh. The final moisture content was about 13 percent of weight of the pellets.

The pellets were partially dried in a pan on a hot plate and screened in order to separate the desired sizes. The fines were repelletized while the coarse particles were desaggregated before recycling.

The partially dried pellets (still containing about 5 percent by weight of water) were introduced in a hot tube furnace and baked for 20 minutes at 920°–940° C. in a nitrogen atmosphere, then cooled down to room temperature under nitrogen atmosphere. In general, the amount of $TiO_2$ to carbon in the coked particles (pellets)

are 40 to 60 percent by weight $TiO_2$, and 15 to 20 percent by weight carbon.

The resulting coked pellets were separated from each other very easily when touched. The hydrogen content was less than 0.2 percent by weight.

The strength of the pellets after coking varied widely from one binder to the other and with the amount of binder, however, suitable strength after coking, should be maintained within a range from 100 to 2000, preferably from 300 to 600 g/mmD.

Table I illustrates the effect of binder on the particle strength and eventually abradability (percent by weight carry over per hour).

TABLE I

Effect of binder on strength and abradability of coked particles (in grams referred to 1 mm diameter size granules).

| Test | Binder | % Binder By Weight | Strength g/mmD* | Abradability** |
|---|---|---|---|---|
| 1 | $FeCl_2$ | 1.0 | 50 | 3.94 |
| 2 | $Na_2SO_3$ | 1.4 | 1600 | Not determined |
| 3 | $Na_2SO_3$ | 0.6 | 1875 | Not determined |
| 4 | $Na_2SO_4$ | 0.5 | 1135 | Not determined |
| 5 | Lignosol | 1.0 | 608 | 0.84 |
| 6 | Lignosol | 0.5 | 378 | 0.27 |
| 7 | Lignosol | 0.25 | 308 | 0.13 |

*D = diameter size of grains expressed as 1 mm for strength calculation.
**Abradability is defined as percentage by weight carry-over per hour from the fluid bed.

The strength of the granules followed the empirical formula $$F = S \cdot D^{1.155}$$

where:
F is the force in grams necessary to break the granules
D is the diameter
S is the constant strength in grams per one mm of diameter.

From tests 5, 6, and 7 in the Table I, it is evident that the amount of binder has a reverse effect on strength versus abradability. Hence, generally a binder is used in proportions, based on slag and coal, taken as 1 (unit) from 0.002 to 0.010.

The effect of slag:coal ratio has been tested. Pellets with good strength were obtained with a ratio of 2:1, a broader proportional relationship is from 2.5:1 to 1.5:1.

The Table II shows the bulk densities of the coked pellets.

The fluidization characteristics of the same granules as in Table II are shown in Table III measured for a 2" diameter fluid bed.

TABLE III

| | | Fluidization Characteristics Coked Pellets | | |
|---|---|---|---|---|
| Test | Temperature | Min. Fluid Flow SCFH+ (Nitrogen) | Gmf++ lb.ft.−2hr−1 | Gas Veloxity($N_2$) ft.sec.−1 |
| A | Room | 60 | 105.2 | 0.766 |
| | 710° C. | 3.6 | 6.32 | 0.046* |
| | | | | 0.159** |
| B | Room | 50 | 87.8 | 0.649 |
| C | Room | 45 | 78.0 | 0.575 |

*Referred to volume measured at room temperature.
**With a temperature correction taking account of gas expansion at 710° C.
+SCFH = Standard cubic foot per hour of nitrogen (at 72° F.).
++GMF = Minimum fluidizing mass velocity, i. e., minimum mass of gas required per unit time to fluidize the grains.

Figure 2:
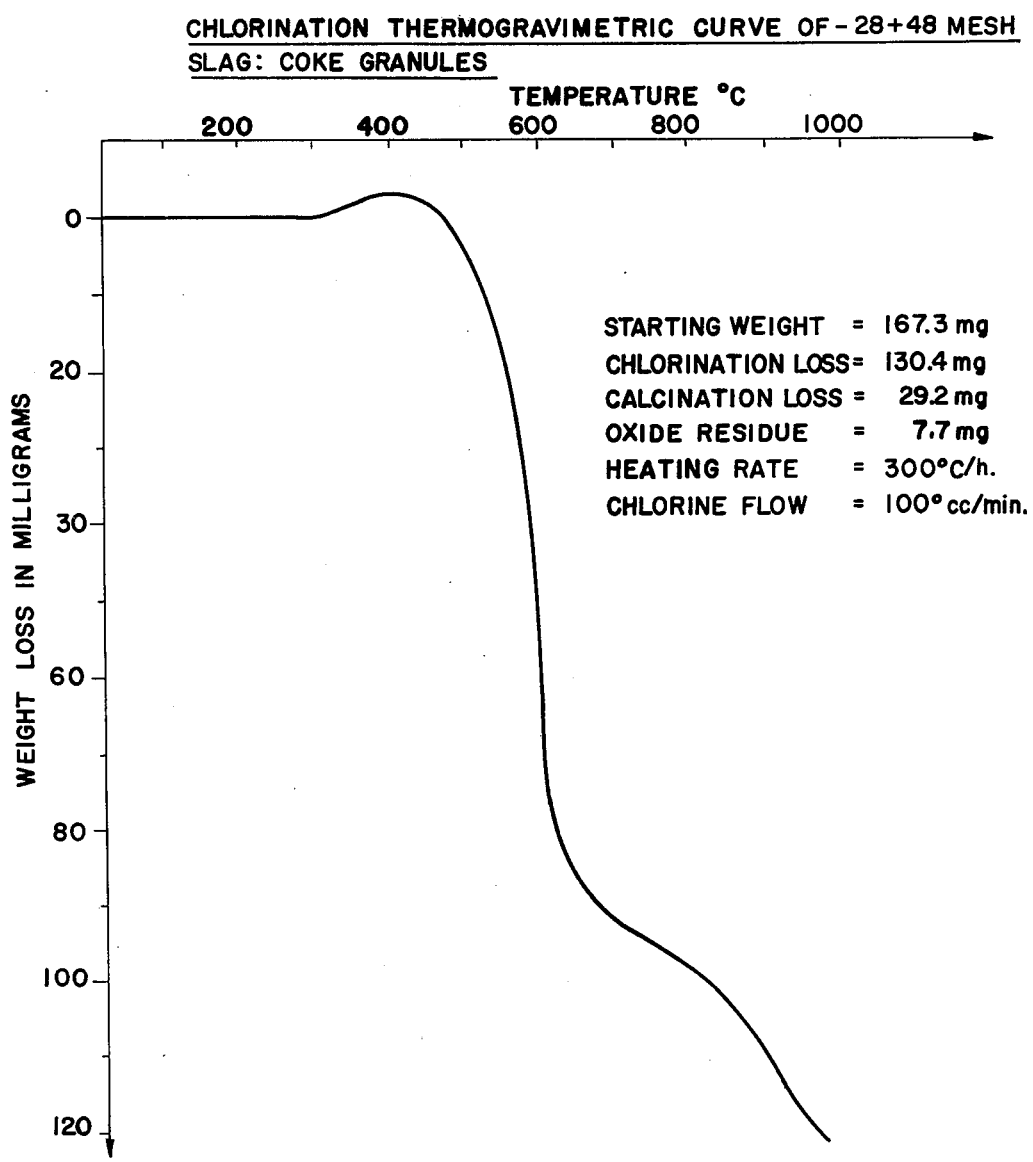
FIG. 2 is a chlorination thermogravimetric curve of −28+48 mesh slag: coke granules.

From the above data and further data, a graph has been drawn as illustrated in FIG. 1, which shows the effect of particle size on fluidization at 710° C. Further, a graph has been illustrated as shown in FIG. 2 which represents a thermogravimetric curve for chlorination of −28+48 mesh slag:coke (2:1 ratio) which shows that the reaction proceeds in several stages:

weight gain from 300°-400° C. due to non-volatile chloride formation mainly $FeCl_2$.

strong reaction from 450°-600° C. mainly due to $TiCl_4$ formation.

$Al_2O_3$ and $SiO_2$ chlorination from 800°-900° C.

$MgCl_2$ distillation above 950° C.

Figure 3:
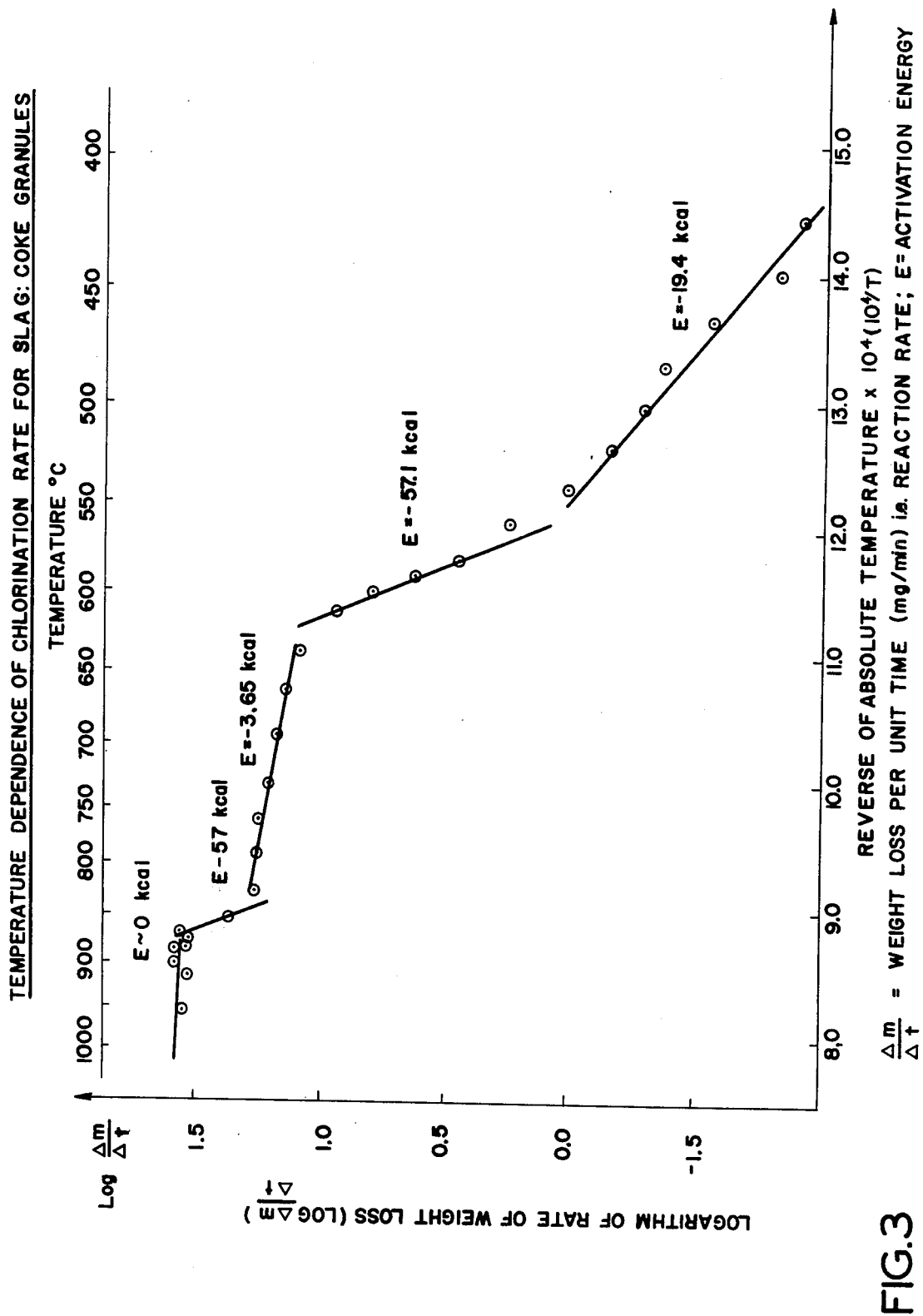
FIG. 3 shows the temperature dependence of the rate of $TiCl_4$ formation.

With reference to FIG. 3, it shows the temperature dependence of the rate of the main reaction ($TiCl_4$ formation) which shows a relatively small change in terms of the low activation energy above 650° C.

The effects of particle size on chlorination rate was found to obey an empirical formula as follows:

$$\Delta m / \Delta t = k D^{0.179}$$

where the rate constant k=21.3 percent per minute for granules of 1 mm diameter at 695° C.

$\Delta m / \Delta t$ = expressed in mg per minute is weight loss per unit time.

D granule diameter in millimeters.

The chlorination rate increases slightly with change in diameter of a granule which is apparently due to a larger porosity, i.e., surface area.

Granules of the composition shown in Table IV have been chlorinated in an externally heated 2" fluid bed.

TABLE II

| | Bulk Density of Coked Pellets | | | | | |
|---|---|---|---|---|---|---|
| | Particle Size Distribution in % | | | | | Bulk Density |
| Test | −20+28 | −28+48 | −48+65 | −65+100 | −100 (mesh) | g/cc | lb/cu.ft. |
| A | 15.3 | 64.6 | 11.2 | 7.3 | 1.5 | 1.000 | 62.43 |
| B | 11.7 | 62.5 | 13.7 | 10.3 | 1.8 | 0.915 | 57.12 |
| C | 5.5 | 62.0 | 16.1 | 13.1 | 3.15 | 0.905 | 56.50 |

TABLE IV

| Typical analysis in percent by weight of slag:coke granules from a ratio of slag:coal:Lignosol = 100:50:0.375 parts | | | | | | | | | | |
|---|---|---|---|---|---|---|---|---|---|---|
| $TiO_2$ | C | $Fe_T$ | $Al_2O_3$ | $SiO_2$ | CaO | MgO | $V_2O_5$ | $Cr_2O_3$ | H | L.O.I. |
| 52.5 | 24.4 | 7.7 | 4.9 | 4.7 | 0.8 | 3.9 | 0.4 | 0.1 | 0.17 | 23.3 |

$Fe_T$ = total iron expressed as elemental iron although partially present as FeO.
L.O.I. = loss on ignition (essentially carbon less the oxygen fixed by lower valency oxides during calcination in air, such as FeO → $Fe_2O_3$).

According to the invention, the articles of manufacture contain various components in various proportions therein as shown by the following analysis, in percent by weight:

| $TiO_2$ | C | $Fe_T$ | $Al_2O_3$ | $SiO_2$ | CaO | MgO | H |
|---|---|---|---|---|---|---|---|
| 50–55 | 20–30 | 5–10 | 3–5 | 3–5 | 0.6–1.0 | 3.0–5.0 | 0.1–0.3 |
| $V_2O_5$ | $Cr_2O_3$ | L.O.I. | | | | | |
| 0.3–0.5 | 0.05–0.15 | 18–28 | | | | | |

With reference to the above data, in general, chlorination was carried out with a 50:50 mixture of chlorine and air (based on volume). A variation from 100:0.0 can also be used. The utilization of chlorine was about 98% for a bed high of 35–40 cm (14–16 inches) at a flow rate of 3.10 liters/minute of chlorine (standard temperature volume; temperature=20° C.). The temperature range was 690°–740° C. The total running time was 133 minutes for treatment of 1036.8 g. of granules, the initial charge was 200 g. and 28.4 g. was generally added every 3 minutes up to a total of 836.8 g. until all available granules were fed. At the end of the test, the bed was fluid and 137.1 g. of solids were collected in the reactor which reduced to 110.0 g. after washing and drying corresponding to a 19.8 percent soluble chloride in the charge without any sticking.

450 g. of solids were collected as dry dust carry-over containing 41.5 percent of soluble chlorides. Total amount of $TiCl_4$ collected was 996.8 g.

The solid composition in the bed was (in percent by weight):

| $TiO_2$ | C | $Fe_T$ | $Al_2O_3$ | $SiO_2$ | CaO | MgO | Water Solubles |
|---|---|---|---|---|---|---|---|
| 39.45 | 15.72 | 1.29 | 12.42 | 6.45 | 0.47 | 3.77 | 19.77 |

In the dust collector the composition of the solids after washing was (in percent by weight):

| $TiO_2$ + $Fe_2O_3$ + $SiO_2$ + $Al_2O_3$ + CaO + MgO etc. | Carbon | Oxide/C ratio |
|---|---|---|
| 54.3 | 45.7 | 1.19 |

The conversion into chlorides of the various oxides were (in percent by weight):

| $TiO_2$ | $SiO_2$ | $Al_2O_3$ | CaO | MgO |
|---|---|---|---|---|
| 93 | 1.0 | 1.0 | 35 | 85 |

In accordance to the above, it is readily evident that slags and titanium dioxide sources which heretofore could not have been utilized as starting materials are now amenable to processing and provide ready source material for eventual production of titanium dioxide via the chloride route or provide a ready source of $TiCl_4$. Increasing scarcity of high grade raw materials can thus be economically met by turning to raw material sources in plentiful supply such as found on the North American continent.

What is claimed is:

1. As an article of manufacture, controllably abradable coked grains for obtaining titanium values therefrom comprising $TiO_2$ and a carbonaceous material in a weight ratio of from 1.5 to 2.5:1, respectively, of a hydrogen content of less than 0.2% by weight, as a binder therefor 0.25% to 1.00% per dry weight of the $TiO_2$ and carbonaceous material, a mesh size from 8 to 150; a crushing strength from 100 to 2000 g/mmD, and a pore size of 1 to 50 microns.

2. The articles of manufacture according to claim 1, wherein the analysis of said grains is as follows, in percent by weight:

| $TiO_2$ | C | | $Fe_T$ | $Al_2O_3$ | $SiO_2$ |
|---|---|---|---|---|---|
| 50–55 | 20–30 | | 5–10 | 3–5 | 3–5 |
| CaO | MgO | H | $V_2O_5$ | $Cr_2O_3$ | L.O.I. |
| 0.6–1.0 | 3.0–5.0 | 0.1–0.3 | 0.3–0.5 | 0.05–0.15 | 18–28, | wherein $Fe_T$ is total iron content present expressed as elemental iron.

3. The articles of manufacture as defined in claim 1, wherein the grains have the following composition for a titanium dioxide containing slag:coal and, as a binder, cellulose sulfonate, wherein the same are in a ratio of about 100:50:0.4:

| $TiO_2$ | C | | $Fe_T$ | $Al_2O_3$ | $SiO_2$ |
|---|---|---|---|---|---|
| 52.5 | 24.4 | | 7.7 | 4.9 | 4.7 |
| CaO | MgO | H | $V_2O_5$ | $Cr_2O_3$. | L.O.I. |
| 0.8 | 3.9 | 0.17 | 0.4 | 0.1 | 23.3, | wherein $Fe_T$ is total iron content present, expressed as elemental iron.

* * * * *